(12) United States Patent
Brede et al.

(10) Patent No.: US 7,182,012 B2
(45) Date of Patent: Feb. 27, 2007

(54) PYROTECHNICALLY DRIVEN DEVICE FOR CUTTING SOLID, COMPACT MATERIALS

(75) Inventors: Uwe Brede, Fuerth (DE); Jurgen Knauss, Obermichelbach (DE); Diedrich Von Behr, Erlangen (DE)

(73) Assignee: Delphi Technologies, Inc., Troy, MI (US)

( * ) Notice: Subject to any disclaimer, the term of this patent is extended or adjusted under 35 U.S.C. 154(b) by 61 days.

(21) Appl. No.: 10/901,048

(22) Filed: Jul. 29, 2004

(65) Prior Publication Data

US 2005/0115390 A1    Jun. 2, 2005

(30) Foreign Application Priority Data

Jul. 29, 2003    (DE) ................. 103 34 890
May 12, 2004   (DE) ................. 10 2004 023 415

(51) Int. Cl.
*B60K 28/10* (2006.01)

(52) U.S. Cl. ........................................... 89/1.14

(58) Field of Classification Search .............. 89/1.14; 137/83, 68.13

See application file for complete search history.

(56) References Cited

U.S. PATENT DOCUMENTS

| | | | | |
|---|---|---|---|---|
| 3,482,484 A | * | 12/1969 | Brizzolara | ............ 89/1.1 |
| 3,763,738 A | * | 10/1973 | Temple | ............ 89/1.14 |
| 3,895,552 A | * | 7/1975 | Lagofun | ............ 83/580 |
| 4,215,749 A | * | 8/1980 | Dare et al. | ............ 166/361 |
| 4,224,487 A | * | 9/1980 | Simonsen | ............ 200/61.08 |
| 5,615,911 A | * | 4/1997 | Amano | ............ 280/734 |
| 5,877,563 A | * | 3/1999 | Krappel et al. | ............ 307/10.1 |
| 6,078,108 A | * | 6/2000 | Froschl | ............ 307/10.7 |
| 6,222,439 B1 | * | 4/2001 | Tanigawa et al. | ............ 337/401 |
| 6,843,157 B2 | * | 1/2005 | Hamilton et al. | ............ 83/639.4 |

\* cited by examiner

*Primary Examiner*—Michael J. Carone
*Assistant Examiner*—Susan C. Alimenti
(74) *Attorney, Agent, or Firm*—Jimmy L. Funke

(57) ABSTRACT

A pyrotechnic cutting device has a guiding housing in which there is arranged a part to be severed, which is fashioned so as to be severable at a cut point by a cutting tool having a cutting chisel. A pressure pulse generator containing a pyrotechnic driving charge is arranged in the cutting device for generating a pressure pulse to drive the cutting tool. In the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel. The cutting tool has its cutting chisel abutting the cut point before the impact capsule strikes the thrust base.

12 Claims, 4 Drawing Sheets

PYROTECHNICALLY DRIVEN DEVICE FOR CUTTING SOLID, COMPACT MATERIALS

TECHNICAL FIELD

This invention relates to a pyrotechnic cutting device according to the preamble of Claim 1.

BACKGROUND

There are known pyrotechnic cutting devices in which, by the generation of a gas pressure pulse by combustion of pyrotechnic material, a cutting tool is driven in order to cut various materials such as for example ropes, wires, current buses, or plastic bars for the most varied purposes.

For example, DE 38 18 669 C1 describes such a cutting device as a "rope cutting device." Here, by the generation of the pyrotechnic pressure pulse, an initially restrained cutting chisel is accelerated over a short free-flight path in order to sever the rope or a wire after the absorption of kinetic energy.

Other documents, "Pyrotechnic Cutting Device," DE 44 38 157 C1, or "Power Cutter," DE 197 32 650 A1, describe "free-flying cutting tools" without restraint, in which the initial friction and the mass represent the only hindrance to the driving pressure pulse. These mechanisms, however, are also suitable for cutting materials of the most varied shapes and purposes. In the known approaches, however, it is disadvantageous if insulating materials with low mechanical strength are used for the cutting tools on technical and cost grounds, such as for example plastic parts fabricated by injection molding. Specifically, if the cutting tool itself has a high velocity with which the actual effective edge or surface of the cutting chisel impacts on the medium to be cut, then high and uncontrolled transverse accelerations and rebounds occur because of the mechanical interaction between the effective edge and the material to be severed, which has the principal effect of making it extraordinarily difficult and in some cases impossible to employ low-cost plastics as material for the cutting tool. The tolerances of the tool guiding elements must likewise be very close, which cannot be achieved at low cost.

It is a goal of the invention further to develop a pyrotechnic cutting device according to the preamble of claim 1 in such fashion that the problems resulting from free flight of the cutting tool are avoided, the economical use of plastics in the cutting device is possible, and a pressure pulse generator adaptable to a variety of materials to be cut and also to a variety of geometries can be implemented in one and the same device for a given structural volume.

SUMMARY

According to the invention, this goal is achieved in that an impact capsule is arranged in the guiding housing between the pressure pulse generator and the cutting tool, which impact capsule can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base.

The problems resulting from free flight of the cutting tool are avoided with the impact capsule according to the invention and the abutment of the cutting tool with its cutting chisel on the cut point before the impact capsule strikes the thrust base; what is more, the economical use of plastics in the cutting device is possible because uncontrolled transverse accelerations and rebounds of the cutting tool do not occur. Further, the cutting performance is improved, so that a pressure pulse generator adaptable to a variety of materials to be cut and also to a variety of geometries can be implemented in one and the same device for a given structural volume.

In a preferred embodiment, the material to be cut is fashioned in a U shape and the impact capsule is arranged spaced away from the thrust base inside the cutting tool abutting the material to be cut.

The impact capsule preferably has its outer peripheral wall slidably abutting the inner peripheral wall of the cutting tool. This arrangement with one component slid inside the other provides good guidance of the impact capsule in the smallest structural volume. The open ends of the impact capsule and of the cutting tool are preferably arranged positively locked to one another or are at the same height as viewed in the longitudinal direction of the cutting device.

In an advantageous embodiment according to the invention, a compression volume is arranged between the thrust base of the cutting tool and the impact capsule.

Further, the impact capsule and the cutting tool preferably encompass the pressure pulse generator, a drive volume being arranged between the pressure pulse generator and the impact capsule. The open ends of the cutting tool and of the impact capsule preferably lie on a projection of the pressure pulse generator.

In a preferred embodiment, the impact capsule has a circumferential flare on its open end on the outer peripheral wall or has two or more outwardly bent restraining tongues, and the cutting tool has a circumferential chamfer shaped in accordance with the flare or the restraining tongues on the inside at the open end, that is, on the inner peripheral wall. The flare engages, or the bent restraining tongues of the impact capsule engage, into this circumferential chamfer. This has the advantage that in every case, after the ignition of the pressure pulse generator and before the impact capsule strikes the inner thrust base of the cutting tool, the accelerated impact capsule carries the cutting tool along—unless it already abuts the cut point—until the cutting tool abuts the cut point. Only then does the flare, or do the restraining tongues, disengage from the circumferential chamfer and the impact capsule hits the inner thrust base of the cutting tool.

For cost reasons, the cutting tool, the impact capsule, and the guiding housing are preferably made of glass-fiber-reinforced plastic.

The mass ratio of the impact capsule to the cutting tool is advantageously approximately 1:3 and/or the volume ratio of the drive volume to the compression volume is approximately 1:3.

In a further advantageous embodiment, a pyrotechnic pressure pulse booster element is emplaced on the thrust base in the fashion of a pyrotechnic booster charge, an ignition element, preferably a primer pellet, being arrangeable in the pressure pulse booster element.

For the better ignition of the pressure pulse booster element or of the ignition device, the impact capsule advantageously has a striking pin on the side facing toward the pressure pulse booster element or the ignition device.

In a preferred embodiment, the part to be severed is a current bus and the cutting device is used in a battery shutoff, preferably in a motor vehicle.

BRIEF DESCRIPTION OF THE DRAWINGS

The invention is explained in greater detail in what follows with reference to the Drawings.

DETAILED DESCRIPTION OF THE DRAWINGS

Figure 1:
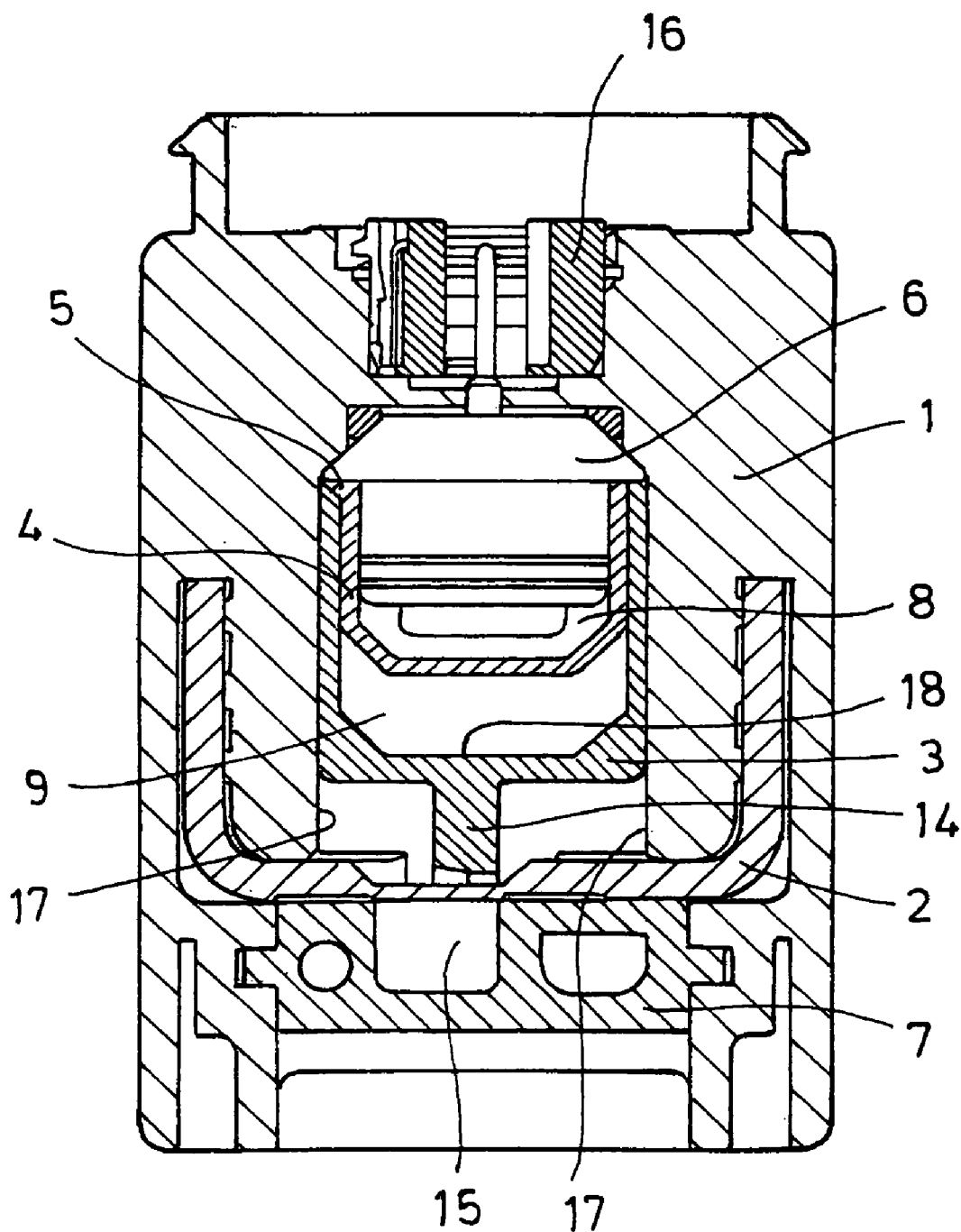
FIG. 1 is a cross sectional view of one embodiment of the pyrotechnic cutting device.

FIG. 1 shows a cutting tool 3 made of plastic reinforced with glass fibers, which cutting tool is guided in a cylindrical guide 17 of a guiding housing 1, which is likewise molded from plastic reinforced with glass fibers. On its end facing toward a material 2 to be severed, cutting tool 3 has a cutting chisel 14, which abuts a cut point of material 2 to be severed. In this embodiment, material 2 to be severed is a current bus. Material 2 to be severed is clamped in by a mating support 7, which is inserted and clamped into guiding housing 1.

Figure 2:
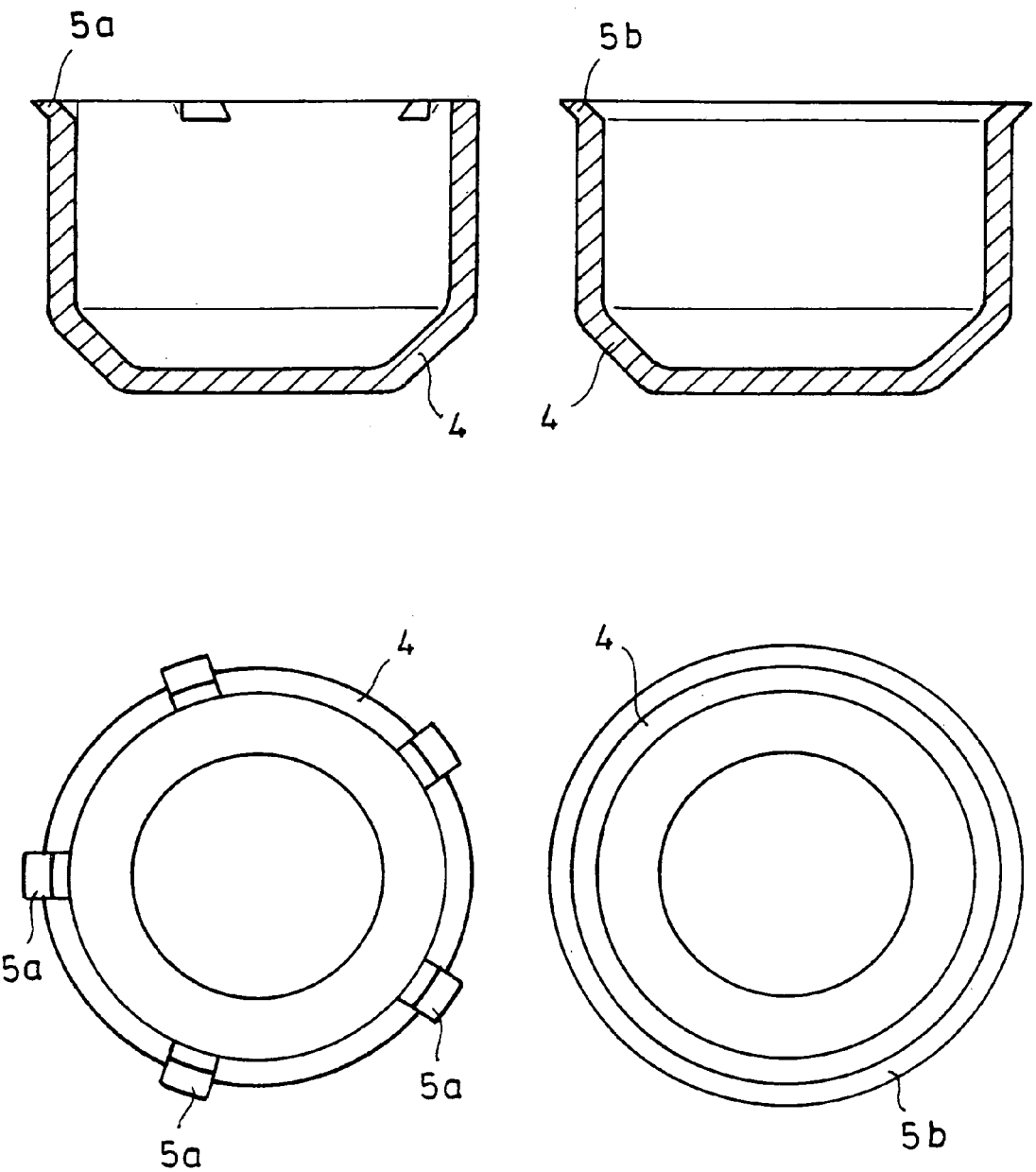
FIG. 2 is an enlarged cross sectional view of impact capsules for uses with the pyrotechnic cutting device of FIG. 1.

An impact capsule 4, which like cutting tool 3 is fashioned U-shaped in cross section, is slid over a pressure pulse generator 6, which is likewise arranged in cylindrical guide 17 of guiding housing 1, the impact capsule having at its open end a circumferential flare 5b or two or more (e.g., preferably 2 to 5) bent restraining tongues 5a (see FIG. 2). On its open end, on the inside, that is, on the inner peripheral wall, cutting tool 3 has a circumferential chamfer shaped in accordance with the radial length and/or the angle of restraining tongues 5 or flare 5b of impact capsule 4. Thus impact capsule 4 has its outer peripheral wall slidably abutting the inner peripheral wall of cutting tool 3. In this way, good guidance of the impact capsule is achieved in the smallest structural volume. Pressure pulse generator 6 is ignited electrically, the power supply being provided via a connector 16 on guiding housing 1.

Cutting tool 3 placed on material 2 to be severed, in this case the current bus, forms a functional unit with impact capsule 4, pressure pulse generator 6, guiding housing 1, and mating support 7.

Functional Description

If pressure pulse generator 6 is triggered—for example by an electric current pulse from the crash sensor of a motor vehicle—the chemical reaction of the pyrotechnic material in the pressure pulse generator produces a gas pressure, which propagates in drive volume 8 and transfers to impact capsule 4 a resultant shock force corresponding to the pressure and the area of action. If this shock force exceeds the holding force of restraining tongues 5a or flare 5b, impact capsule 4 moves with a high initial acceleration toward the inner thrust base 18 of cutting tool 3. During the process of release of impact capsule 4, the still incompletely rebent restraining tongues 5a exert, or a flare 5b exerts, a thrust on cutting tool 3 via its tubular jacket. This function takes up any undesired play that may be present between cutting tool 3 and material 2 to be severed or the current bus.

As impact capsule 4 approaches the inner thrust base 18 of cutting tool 3 at a high velocity (which can well be as much as or more than 100 m/s), the pressure in compression volume 9 rises rapidly as a consequence of the compression, and heating takes place at the same time.

If this process of the motion of impact capsule 4 proceeds very rapidly, a near-adiabatic compression situation can be assumed. As a result, the greatest part of the energy of impact capsule 4 is transferred to cutting tool 3 without rebounding. The shock force so transferred drives cutting tool 3 and shears through current bus 2 at the cut point and bends it over into a receiving space 15.

With the cutting device according to the invention, it has advantageously proven that when the mass ratio of impact capsule 4 and cutting tool 3 is set to 1:3 and the volume ratio of drive volume 8 and compression volume 9 is set to 1:3, material 2 to be severed or the current bus is cut with absolute reliability without damage to guiding housing 1. An essential feature of the function of the cutting device and of the adaptability to a variety of cutting tasks or cutting materials is the fashioning of restraining tongues 5a or of flare 5b.

A further goal of the invention was to secure proper cutting of material 2 to be severed, even given large fluctuations in the charge quantity in pressure pulse generator 6, without damage to the device or guiding housing 1. The accuracy of metering of the pyrotechnic charge in pressure pulse generator 6 is a substantial cost factor. The larger the acceptable fluctuation, the lower the cost of pressure pulse generator 6 or of its fabrication. The upper bound should be governed only by the housing strength of guiding housing 1. Restraining tongues 5a ensure, or flare 5b ensures, that impact capsule 4 cannot be accelerated until after restraining tongues 5a have, or flare 5b has, been rebent. As a consequence, low pyrotechnic charges mean only that it takes somewhat more time for impact capsule 4 to be accelerated. If pressure pulse generator 6 contains higher charges, this initial phase is completed more quickly. It has been determined that proper cutting without destruction of the housing takes place when the charge quantity fluctuates by as much as ±30% of the mean charge.

Figure 3:
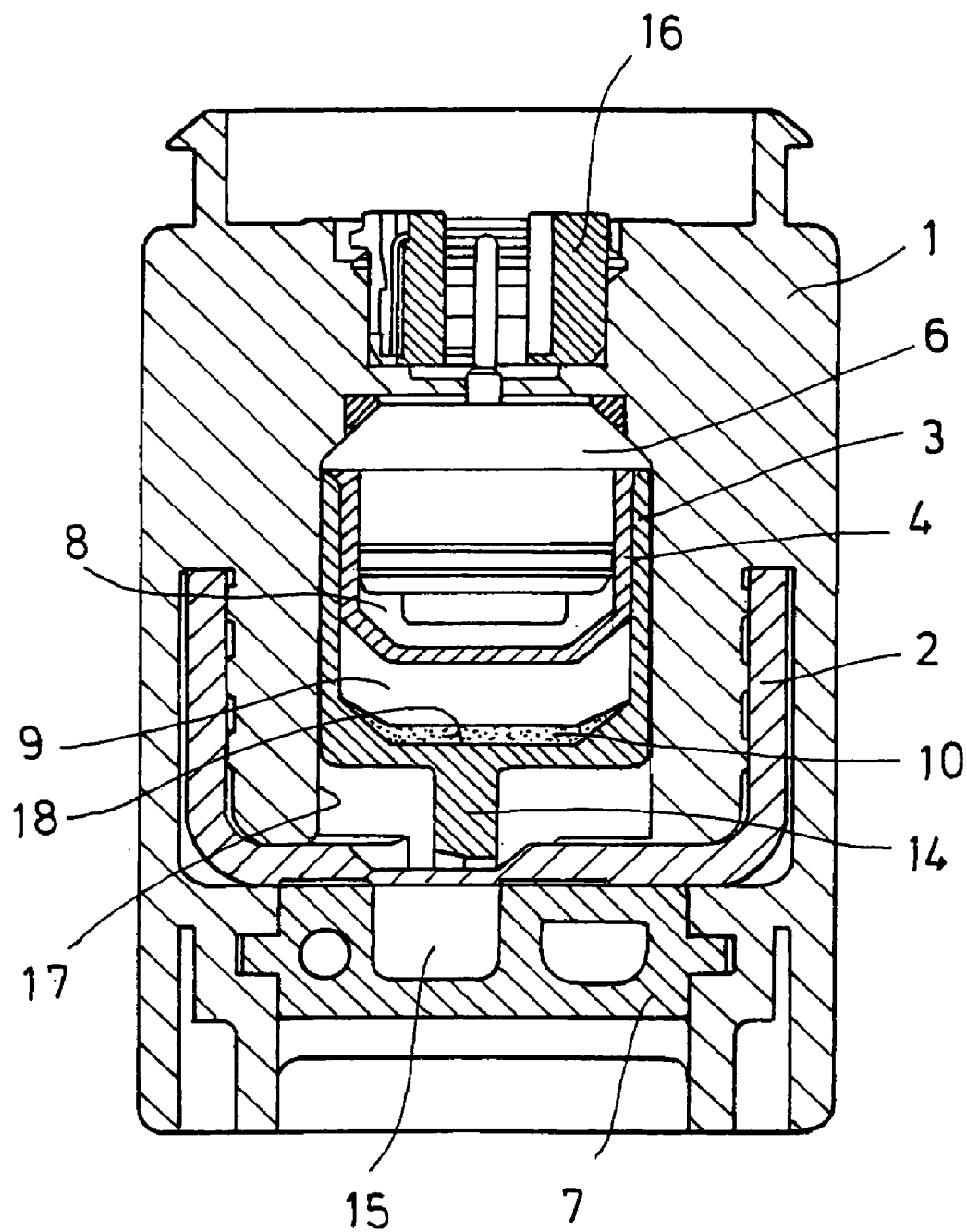
FIG. 3 is a cross section of the pyrotechnic cutting device of FIG. 1 including a pyrotechnic booster charge.
Figure 4:
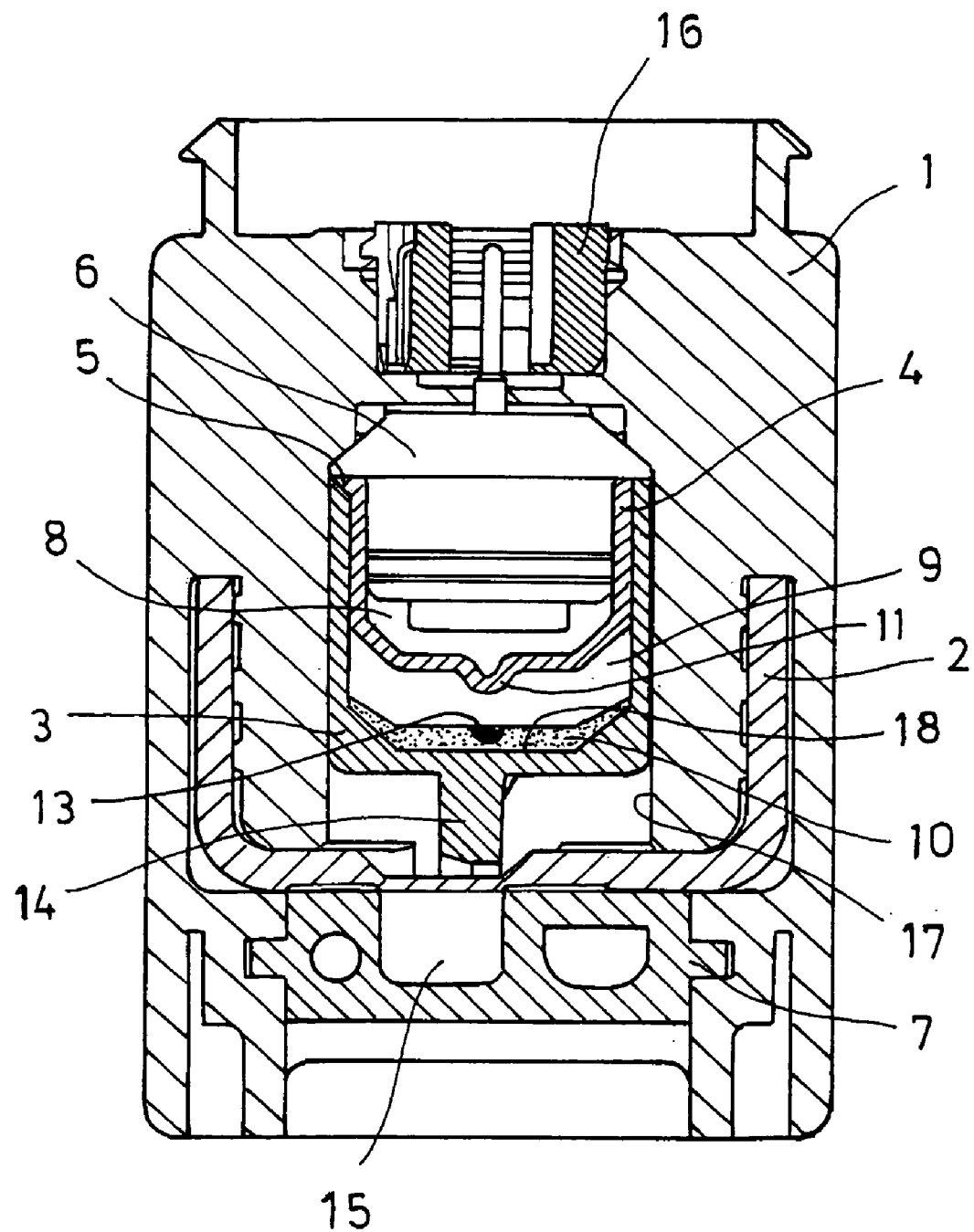
FIG. 4 is a cross section of the pyrotechnic cutting device of FIG. 1 including a pyrotechnic booster charge a having a printer pellet.

A further development of the pyrotechnic cutting device according to the invention is implemented by arranging a pyrotechnic pressure pulse booster element 10 on the thrust base 18 of cutting tool 3. FIGS. 3 and 4 depict two distinct embodiments. FIG. 3 shows the arrangement of a pyrotechnic pressure pulse booster element 10 with no additional ignition device. FIG. 4, on the other hand, shows a primer pellet 13 as the ignition device, which is integrated into pressure pulse booster element 10. In addition, impact capsule 4 has a mechanical striking ignition arrangement in the form of a striking pin 11 on its end facing toward the thrust base or toward pressure pulse booster element 10.

If more power is required and pressure pulse generator 6 is at its upper power limit, pressure pulse booster element 10 makes it possible to sever even thicker materials 2 to be severed in the same cutting device without additional reinforcements or measures to enhance the strength.

The function of pressure pulse booster element 10 arranged in FIG. 3 is as follows:

Upon the acceleration of impact capsule 4 toward the thrust base 18 of cutting tool 3, the air in compression volume 9 is heated to the point that the pyrotechnic material in pressure pulse booster element 10 is ignited. This is described in detail in DE 42 42 014 A1. Preferably an absorbent porous substrate material is impregnated with pyrotechnic material such as for example a gas set for airbags. The quantity is to be adapted to the cutting task but should not occupy more than 20% of compression volume 9.

FIG. 4 shows a mechanical supplemental ignition device in the form of a primer pellet 13 in pressure pulse booster element 10. It is needed if the pyrotechnic material constituting pressure pulse booster element 10 has a very high ignition temperature or requires more energy for ignition than the adiabatic compression generates. When striking pin 11 of impact capsule 4 strikes primer pellet 13, which is arranged in pressure pulse booster element 10, the chemical reaction is initiated, the pressure pulse booster element is ignited, and a supplemental pressure pulse is thereby generated.

The invention claimed is:

1. Pyrotechnic cutting device having a guiding housing in which there is arranged a part to be severed, which is fashioned so as to be severable at a cut point by a cutting tool having a cutting chisel, and a pressure pulse generator containing a pyrotechnic driving charge is arranged in the cutting device for generating a pressure pulse to drive the cutting tool, characterized in that in the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base, wherein the cutting tool and the impact capsule are fashioned in a U shape and the impact capsule is arranged spaced away from the thrust base inside the cutting tool.

2. Cutting device according to claim 1, characterized in that the impact capsule has its outer peripheral wall slidably abutting the inner peripheral wall of the cutting tool.

3. Cutting device according to claim 1, characterized in that a compression volume is arranged between the thrust base and the impact capsule.

4. Pyrotechnic cutting device having a guiding housing in which there is arranged a part to be severed, which is fashioned so as to be severable at a cut point by a cutting tool having a cutting chisel, and a pressure pulse generator containing a pyrotechnic driving charge is arranged in the cutting device for generating a pressure pulse to drive the cutting tool, characterized in that in the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base, wherein the impact capsule and the cutting tool encompass the pressure pulse generator, a drive volume being arranged between the pressure pulse generator and the impact capsule.

5. Pyrotechnic cutting device having a guiding housing in which there is arranged a part to be severed, which is fashioned so as to be severable at a cut point by a cutting tool having a cutting chisel, and a pressure pulse generator containing a pyrotechnic driving charge is arranged in the cutting device for generating a pressure pulse to drive the cutting tool, characterized in that in the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base, wherein the impact capsule has at its open end, on the outer peripheral wall, a circumferential flare or two or more outwardly bent retaining tongues, and the cutting tool has a circumferential chamfer shaped in accordance with the flare or the restraining tongues on the inside at the open end, that is, on the inner peripheral wall.

6. Cutting device according to claim 1 characterized in that the cutting tool, the impact capsule, and the guiding housing are made of glass-fiber-reinforced plastic.

7. Pyrotechnic cutting device having a guiding housing in which there is arranged a part to be severed, which is fashioned so as to be severable at a cut point by a cutting tool having a cutting chisel, and a pressure pulse generator containing a pyrotechnic driving charge is arranged in the cutting device for generating a pressure pulse to drive the cutting tool, characterized in that in the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base, wherein the mass ratio of the impact capsule to the cutting tool is approximately 1:3 and/or the volume ratio of the drive volume to the compression volume is approximately 1:3.

8. Pyrotechnic cutting device having a guiding housing in which there is arranged a part to be severed, which is fashioned so as to be severable at a cut point by a cutting tool having a cutting chisel, and a pressure pulse generator containing a pyrotechnic driving charge is arranged in the cutting device for generating a pressure pulse to drive the cutting tool, characterized in that in the guiding housing there is arranged, between the pressure pulse generator and the cutting tool, an impact capsule that can be accelerated by the pressure pulse of the triggered pressure pulse generator toward an inner thrust base of the cutting tool on the end of the cutting tool opposite to the cutting chisel, and that the cutting tool has its cutting chisel abutting the cut point before the impact capsule strikes the thrust base, wherein a pyrotechnic pressure pulse booster element is placed on the thrust base in the fashion of a pyrotechnic booster charge.

9. Cutting device according to claim 8, characterized in that an ignition device, preferably a primer pellet, is arranged in the pressure pulse booster element.

10. Cutting device according to claim 8, characterized in that the impact capsule has a striking pin on the side facing toward the pressure pulse booster element or toward the ignition device.

11. Cutting device according to claim 1, characterized in that the part to be severed is a current bus.

12. Cutting device according to claim 1, for use in a battery shutoff, preferably in a motor vehicle.

* * * * *